United States Patent
Gilead et al.

(10) Patent No.: US 9,600,460 B2
(45) Date of Patent: Mar. 21, 2017

(54) NOTES AGGREGATION ACROSS MULTIPLE DOCUMENTS

(71) Applicant: Chegg, Inc., Santa Clara, CA (US)

(72) Inventors: Yehuda Gilead, Rehovot (IL); Arieh Glazer, Rehovot (IL); Shahaf Shakuf, Rehovot (IL); Shannyn Timrott, San Jose, CA (US); Brent Tworetzky, Palo Alto, CA (US); Ohad Eder-Pressman, San Francisco, CA (US); Gerard Genesse, Redwood City, CA (US); Vincent Le Chevalier, San Jose, CA (US); Charles Geiger, San Jose, CA (US)

(73) Assignee: Chegg, Inc., Santa Clara, CA (US)

( * ) Notice: Subject to any disclaimer, the term of this patent is extended or adjusted under 35 U.S.C. 154(b) by 583 days.

(21) Appl. No.: 13/693,036

(22) Filed: Dec. 3, 2012

(65) Prior Publication Data

US 2014/0019846 A1 Jan. 16, 2014

Related U.S. Application Data

(60) Provisional application No. 61/670,994, filed on Jul. 12, 2012.

(51) Int. Cl.
| | |
|---|---|
| *G06F 17/24* | (2006.01) |
| *G06F 21/10* | (2013.01) |
| *G06Q 50/00* | (2012.01) |
| *G06F 17/30* | (2006.01) |
| *H04L 12/58* | (2006.01) |
| *G06F 17/21* | (2006.01) |

(Continued)

(52) U.S. Cl.
CPC .......... *G06F 17/241* (2013.01); *G06F 17/212* (2013.01); *G06F 17/30014* (2013.01); *G06F 17/30321* (2013.01); *G06F 17/30554* (2013.01); *G06F 21/10* (2013.01); *G06F 21/31* (2013.01); *G06Q 50/01* (2013.01); *H04L 51/08* (2013.01); *G06F 21/70* (2013.01); *G06Q 50/20* (2013.01)

(58) Field of Classification Search
CPC ............................... G06F 17/24; G06F 17/241
USPC ......................................... 715/230, 232, 234
See application file for complete search history.

(56) References Cited

U.S. PATENT DOCUMENTS

| | | |
|---|---|---|
| 6,279,014 B1 | 8/2001 | Schilit et al. |
| 6,457,026 B1 | 9/2002 | Graham et al. |

(Continued)

OTHER PUBLICATIONS

Dejean, H., et al., "Logical Document Conversion: Combining Functional and Formal Knowledge," DocEng'07, Aug. 28-31, 2007, ACM, 2007, pp. 135-143.

(Continued)

*Primary Examiner* — Scott Baderman
*Assistant Examiner* — Seung Jung
(74) *Attorney, Agent, or Firm* — Fenwick & West LLP

(57) ABSTRACT

A digital publishing platform enables users to create and organize notes associated with electronic, published documents. Sets of notes, each associated with a document, are uploaded to the publishing platform by notepad applications executing on user devices. Each set of notes has one or more notes, and each note includes a link to a location in the associated document. The publishing platform is configured to aggregate a plurality of sets of notes, combining the notes of the sets into a single set while maintaining their link to an associated document.

25 Claims, 11 Drawing Sheets

(51) Int. Cl.
   *G06F 21/31*     (2013.01)
   *G06Q 50/20*    (2012.01)
   *G06F 21/70*     (2013.01)

(56) References Cited

U.S. PATENT DOCUMENTS

| | | | |
|---|---|---|---|
| 6,584,480 | B1 | 6/2003 | Ferrel et al. |
| 7,945,852 | B1 | 5/2011 | Pilskalns |
| 8,875,011 | B2 | 10/2014 | Sitrick et al. |
| 8,977,953 | B1* | 3/2015 | Pierre ................. G06F 17/2785 715/201 |
| 2001/0042098 | A1 | 11/2001 | Gupta et al. |
| 2002/0035573 | A1 | 3/2002 | Black et al. |
| 2002/0054138 | A1 | 5/2002 | Hennum |
| 2002/0083096 | A1 | 6/2002 | Hsu et al. |
| 2003/0076352 | A1 | 4/2003 | Uhlig et al. |
| 2004/0255232 | A1 | 12/2004 | Hammond |
| 2005/0010865 | A1 | 1/2005 | Kuppusamy et al. |
| 2005/0251675 | A1 | 11/2005 | Marcjan et al. |
| 2006/0242558 | A1 | 10/2006 | Racovolis et al. |
| 2006/0253449 | A1 | 11/2006 | Williamson et al. |
| 2006/0277482 | A1 | 12/2006 | Hoffman et al. |
| 2007/0073626 | A1 | 3/2007 | Reeder et al. |
| 2007/0130527 | A1 | 6/2007 | Kim |
| 2007/0198534 | A1 | 8/2007 | Hon et al. |
| 2007/0294614 | A1 | 12/2007 | Jacquin et al. |
| 2008/0168073 | A1* | 7/2008 | Siegel et al. .................. 707/100 |
| 2008/0222552 | A1 | 9/2008 | Batarseh et al. |
| 2008/0235142 | A1 | 9/2008 | Gonze et al. |
| 2008/0256113 | A1 | 10/2008 | Rasmussen et al. |
| 2009/0070661 | A1 | 3/2009 | Van den Dungen et al. |
| 2009/0144277 | A1 | 6/2009 | Trutner et al. |
| 2009/0235280 | A1 | 9/2009 | Tannier et al. |
| 2009/0265607 | A1 | 10/2009 | Raz et al. |
| 2009/0307762 | A1 | 12/2009 | Cudd |
| 2009/0327855 | A1 | 12/2009 | Le |
| 2010/0011282 | A1* | 1/2010 | Dollard et al. ............... 715/233 |
| 2010/0131836 | A1 | 5/2010 | Dukhon |
| 2010/0299717 | A1 | 11/2010 | Nasirifard et al. |
| 2011/0022449 | A1 | 1/2011 | Bourne |
| 2011/0047485 | A1 | 2/2011 | Takakura |
| 2011/0078251 | A1 | 3/2011 | Cross et al. |
| 2011/0113320 | A1 | 5/2011 | Neff et al. |
| 2011/0153744 | A1 | 6/2011 | Brown |
| 2011/0239158 | A1 | 9/2011 | Barraclough et al. |
| 2011/0264694 | A1 | 10/2011 | Rensburg et al. |
| 2012/0036423 | A1* | 2/2012 | Haynes et al. ................ 715/230 |
| 2012/0102418 | A1 | 4/2012 | Joy et al. |
| 2012/0110082 | A1 | 5/2012 | Brown et al. |
| 2012/0159313 | A1 | 6/2012 | Dejean |
| 2012/0198017 | A1 | 8/2012 | LeVasseur et al. |
| 2012/0221938 | A1* | 8/2012 | Patterson et al. ............. 715/232 |
| 2012/0233154 | A1 | 9/2012 | Walther et al. |
| 2012/0260283 | A1 | 10/2012 | Purohit |
| 2012/0317308 | A1 | 12/2012 | Penner et al. |
| 2012/0330944 | A1 | 12/2012 | Vailaya et al. |
| 2013/0137078 | A1 | 5/2013 | Shustorovich et al. |
| 2013/0139053 | A1 | 5/2013 | Le Chevalier et al. |
| 2013/0174016 | A1 | 7/2013 | Glazer et al. |
| 2014/0019438 | A1 | 1/2014 | Le Chevalier et al. |

OTHER PUBLICATIONS

Zhao, et al., "Annotating, Linking and Browsing Provenance Logs for eScience," Citeseer, Google, 2006, pp. 1-6.

PCT International Search Report and Written Opinion for PCT/US2013/049133, Jul. 2, 2013, 11 pages.

Liu, Q., et al., "Digital Rights Management for Content Distribution," Australasian Information Security Workshop, 2003, pp. 49-58, Australian Computer Society.

Yu, H., "Digital Multimedia at Home and Content Rights Management," IEEE 4th International Workshop on Networked Appliances, 2002, pp. 49-56.

* cited by examiner

910 — Anna's Biology 101 + Biology 102 Notes:
January 1 – May 8, 2012

Lorem ipsum dolor sit amet, consectetur adipiscing elit. Curabitur placerat, libero vel mollis rhoncus, mauris lacus porta odio, quis aliquam metus urna at ipsum.
pg 8, "Biology 101" >> 01/01/12 8:45 pm      915

"Curabitur egestas porttitor vulputate. In in consequat diam. Pellentesque et leo vel turpis bibendum viverra.
pg. 4, "Biology 101" >> 02/03/12 9:17am Duis tempus, ante sit amet interdum placerat, lectus augue elementum nisi, ac consequat mauris nibh et leo.
pg. 7, "Biology 102" >> 02/29/12 9:02 pm "Nam sed libero ac enim luctus vulputate elementum ut velit. Ut convallis, mauris quis convallis venenatis, nunc diam sagittis metus, vel consequat tortor mi in leo.
pg. 13, "Biology 102" >> 03/24/12 12:23pm Duis tempus, ante sit amet interdum placerat, lectus augue elementum nisi, ac consequat mauris nihil et leo.
pg. 7, "Biology 102" >> 04/09/12 7:15pm Watch this video for an explanation!
pg. 15, "Biology 102" >> 05/08/12 9:47 am

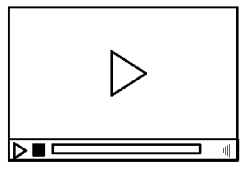

FIG. 9

NOTES AGGREGATION ACROSS MULTIPLE DOCUMENTS

CROSS REFERENCE TO RELATED APPLICATIONS

This application claims the benefit of U.S. Provisional Application No. 61/670,994, filed Jul. 12, 2012, which is incorporated by reference in its entirety.

BACKGROUND

Field of the Invention

This invention relates to creation and aggregation of notes associated with electronic documents.

Description of the Related Art

The rapid shift to mobile Internet services is bringing content offerings to an increasingly larger number of connected devices. Experiences previously limited to a single device are now accessible across multiple devices as high volume consumer electronic platforms such as Smart Phones, tablets, eReaders, game systems, and Internet TVs have become new channels to receive digital documents and services. Popular electronic book services leverage standardized publishing formats to seamlessly integrate and synchronize digital document reading experiences across consumer devices.

But while providing excellent user reading experience for this new digital medium remains a focus of the commercially available eReading systems and applications, it has been so far much more difficult to fully integrate other related reading activities, such as note taking. The simple action of writing a note into the border of a document remains a challenging proposition for a variety of reasons in most digital reading systems. In addition, as new digital content services are progressively embedded within the original document, it becomes increasingly difficult to create, edit, aggregate, and organize these additional content layers into a single reading experience. As digital documents are shifting from a static model to a connected one where related, personalized and other social content are being aggregated dynamically within the original document, it becomes strategic for publishing platforms and their distribution systems to be able to properly author and manage these new individual content layers among a plurality of users.

SUMMARY

A digital publishing platform enables the creation, organization, navigation, and synchronization of personalized notes within HTML5 document publishing. Embodiments of the invention leverage a publishing platform's overall understanding of HTML5 document services and eReading systems for digital content distribution and consumption.

Users create notepad documents associated with published, electronic documents that are stored and distributed by the publishing platform. The published documents are each associated with a table of contents defining the document's structure. Notes generated in association with a document are associated with specific locations within the document, and as a result may be accessed based on the table of contents.

In one embodiment, the publishing platform aggregates a plurality of sets of user notes that are associated with one or more electronic documents. The aggregated notes may be viewed as a standalone document or in the same browser tab as an associated published document, but maintain their association with a location in a document. The notes may be filtered based on any of a number of attributes of each note for ease of reference by a user.

The features and advantages described in this summary and the following detailed description are not all-inclusive. Many additional features and advantages will be apparent to one of ordinary skill in the art in view of the drawings, specification, and claims.

BRIEF DESCRIPTION OF THE DRAWINGS

FIG. 9 illustrates an example aggregated notepad as a standalone document, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
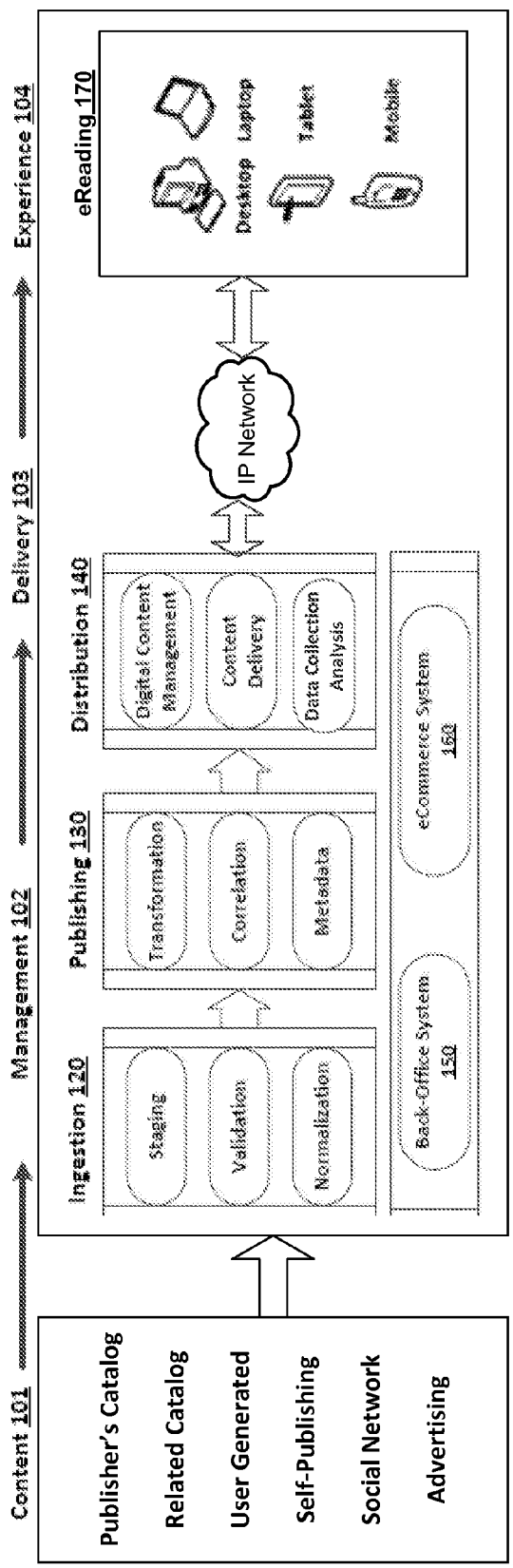
FIG. 1 illustrates an example publishing platform, according to one embodiment.

Embodiments of the invention provide a method for creating notes associated with an HTML document. The method is organized around an educational digital publication and reading platform configured to aggregate, manage, and distribute multilayered content. FIG. 1 is a high-level block diagram illustrating the platform environment, organized around four function blocks: content 101, management 102, delivery 103, and experience 104.

Content block 101 automatically gathers and aggregates content from a large number of sources, categories, and partners. Whether the content is curated, perishable, on-line, or personal, these systems define the interfaces and processes to automatically collect various content sources into a formalized staging environment.

Management block 102 comprises five blocks with respective submodules: ingestion 120, publishing 130, distribution 140, back office system 150, and eCommerce system 160. The ingestion module 120, including staging, validation, and normalization subsystems, ingests published documents that may be in a variety of different formats, such as PDF, ePUB2, ePUB3, SVG, XML, or HTML. The ingested document may be a book, such as a textbook, a set of self-published notes, or any other published document, and may be subdivided in any manner. For example, the document may have a plurality of pages organized into chapters, which could be further divided into one or more sub-chapters. Each page may have text, images, tables, graphs, or other items distributed across the page.

After ingestion, the documents are passed to the publishing system 130, which in one embodiment includes transformation, correlation, and metadata subsystems. If the document ingested by the ingestion module 120 is not in a markup language format, the publishing system 130 automatically identifies, extracts, and indexes all the key elements and composition of the document to reconstruct it into a modern, flexible, and interactive HTML5 format. The ingested documents are converted into markup language documents well-suited for distribution across various computing devices. In one embodiment, the publishing system 130 reconstructs published documents so as to accommodate dynamic add-ons, such as user-generated and related content, while maintaining page fidelity to the original document. The transformed content preserves the original page structure including pagination, number of columns and arrangement of paragraphs, placement and appearance of graphics, titles and captions, and fonts used, regardless of the original format of the source content and complexity of the layout of the original document.

The page structure information is assembled into a document-specific table of contents describing locations of chapter headings and sub-chapter headings within the document, as well as locations of content within each heading. During reconstruction, metadata describing a product description, pricing, and terms (e.g., whether the content is for sale, rent, or subscription, or whether it is accessible for a certain time period or geographic region, etc.) are also added to the transformed document.

The document's table of contents indexes the content of the document into a description of the overall structure of the document, including chapter headings and sub-chapter headings. Within each heading, the table of contents identifies the structure of each page. As content is added dynamically to the reconstructed document, the content is indexed and added to the table of contents to maintain a current representation of the document's structure.

After reconstructing a document, the distribution system 140 packages content of the publishing platform 200 for delivery, uploads the content to content distribution networks, and makes the content available to end-users based on the content's digital rights management policies. In one embodiment, the distribution system 140 includes digital content management, content delivery, and data collection analysis subsystems.

The distribution system 140 may also aggregate additional content layers from numerous sources. These layers, including related content, advertising content, social content, and user-generated content, may be added to the document to create a dynamic, multilayered document. For example, related content may comprise material supplementing the core document, such as study guides, self-testing material, solutions manuals, glossaries, or journal articles. Advertising content may be uploaded by advertisers or advertising agencies to the publishing platform, such that advertising content may be displayed with the document. Social content may be uploaded to the publishing platform by the user or by other nodes (e.g., classmates, teachers, authors, etc.) in the user's social graph. Examples of social content include interactions between users related to the document and content shared by members of the user's social graph. User-generated content includes annotations made by a user during an eReading session, such as highlighting or taking notes. In one embodiment, user-generated content may be self-published by a user and made available to other users as a related content layer.

As layers are added to the document, page information and metadata are referenced by all layers to merge the multilayered document into a single reading experience. The publishing system 130 may also add information describing the supplemental layers to the document's table of contents.

The back-office system 150 of management block 102 enables business processes such as human resources tasks, sales and marketing, customer and client interactions, and technical support. The eCommerce system 160 interfaces with back office system 150, publishing 130, and distribution 140 to integrate marketing, selling, servicing, and receiving payment for digital products and services.

Delivery block 103 of an educational digital publication and reading platform distributes content for user consumption by, for example, pushing content to edge servers on a content delivery network. Experience block 104 manages user interaction with the publishing platform by updating content, reporting users' reading activities, and assessing network performance.

In the example illustrated in FIG. 1, the content distribution and protection system is interfaced directly between the distribution sub-system 140 and the eReading application 170, essentially integrating the digital content management (DCM), content delivery network (CDN), delivery modules and eReading data collection interface for capturing and serving all users' content requests. By having content served dynamically and mostly on-demand, the content distribution and protection system effectively authorizes the download of one page of content at a time through time sensitive dedicated URLs which only stay valid for a limited time, for example a few minutes in one embodiment, all under control of the platform service provider.

HTML5 eReading Environment

Figure 2:
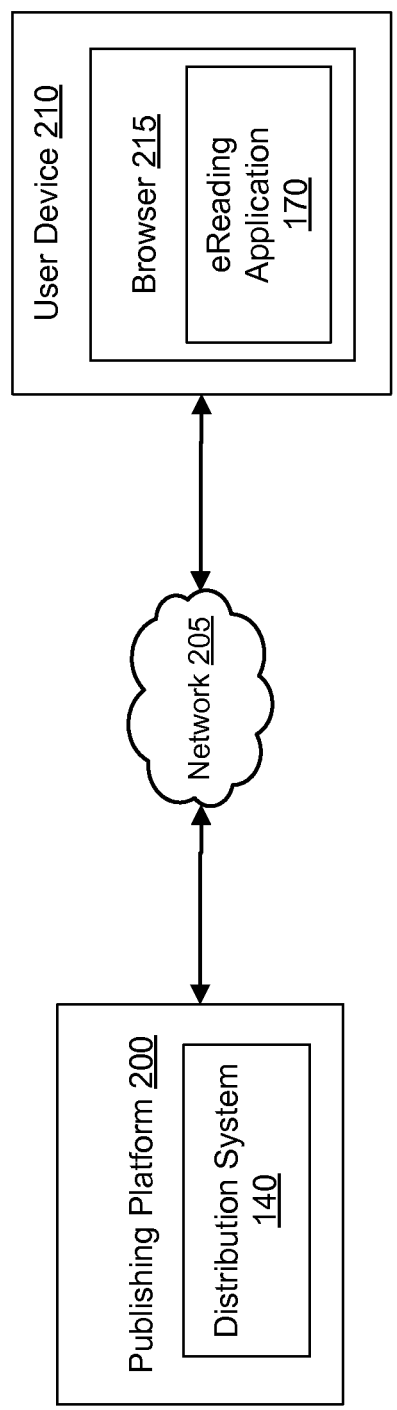
FIG. 2 illustrates a document distribution environment, according to one embodiment.

FIG. 2 illustrates an eReading environment including a publishing platform 200 and a user device 210. One user device 210 is illustrated in FIG. 2, but any number of user devices 210 may communicate with platform 200 to access the content distributed by platform 200. Each device 210 executes a web browser 215 and at least one eReader application 170. In one embodiment, each user is associated with an account on the publishing platform 200, and content purchased by the user is made available through the user account. The user device 210 may also be registered to the account to authorize the device for accessing content. Furthermore, a user may register multiple devices to his account in order to access and interact with layered content synchronously on a plurality of screens. For example, a user may register one or more devices to his account, such as a desktop computer, a laptop, a smart phone, a tablet, an eReader, an Internet television, or any other device including computing functionality and data communication capabilities, and use one or more of these devices simultaneously to interact with a multilayered document.

The content distribution system 140 delivers multilayered content to the eReading browser application 170 executing on the user device 210 through the network 205. The eReading application 170 fetches content from the distribution system 140 in small increments, such as one page at a time. Alternatively, the user device 210 may cache one or more pages of the document to enable faster retrieval of the pages.

Contrary to other existing digital publishing services, the educational digital publication and reading platform of the present invention allows the user to access content without downloading a specific reading application from the publisher. Rather, the eReader application 170, comprising client software compatible with the web browser 215, constructs document pages using structureless HTML5 elements. The eReader application 170 integrates a number of a user's reading activities, including reading the content, navigating between pages, creating highlights, interacting with advertisements, generating social content, and taking notes. This user-generated content is stored and archived into the on-line end user account so that it may be synchronized across all registered devices for a given end user. Thus, the end user's content can be accessed from any of the user's registered devices. It should be noted that eReader applications 170 comprise eReading applications as well as supplemental content applications that function in the browser environment to support the user's eReading activities and overall engagement with the multilayered documents distributed by the platform, such as notepad applications, social applications, and advertising applications.

Communication between the publishing platform 200 and user device 210 is enabled by network 205. In one embodiment, the network 205 uses standard communications technologies and/or protocols. Thus, the network 205 can include links using technologies such as Ethernet, 802.11, worldwide interoperability for microwave access (Wi-MAX), 3G, Long Term Evolution (LTE), digital subscriber line (DSL), asynchronous transfer mode (ATM), InfiniBand, PCI Express Advanced Switching, etc. Similarly, the networking protocols used on the network 305 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 305 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 205 can also include links to other networks such as the Internet.

Figure 3:
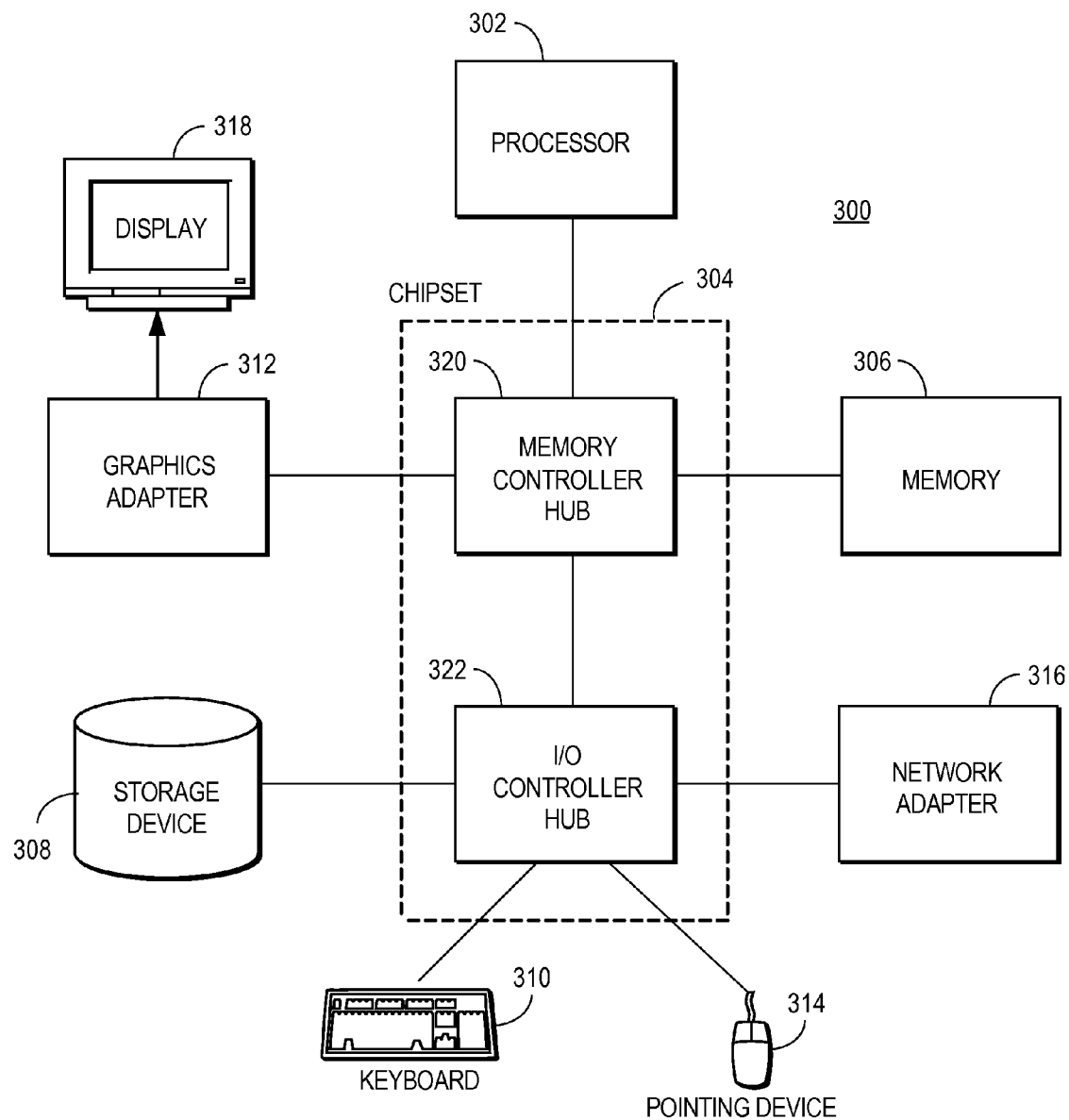
FIG. 3 is a high-level block diagram of a computer for use as a client device, according to one embodiment.

A high-level block diagram of a computer 300, as an example of a user device 210, is illustrated in FIG. 3. Illustrated are at least one processor 302 coupled to a chipset 304. The chipset 304 includes a memory controller hub 320 and an input/output (I/O) controller hub 322. A memory 306 and a graphics adapter 312 are coupled to the memory controller hub 320, and a display device 318 is coupled to the graphics adapter 312. A storage device 308, keyboard 310, pointing device 314, and network adapter 316 are coupled to the I/O controller hub 322. Other embodiments of the computer 300 have different architectures. For example, the memory 306 is directly coupled to the processor 302 in some embodiments.

The storage device 308 is a non-transitory computer-readable storage medium such as a hard drive, compact disk read-only memory (CD-ROM), DVD, or a solid-state memory device. The memory 306 holds instructions and data used by the processor 302. The pointing device 314 is a mouse, track ball, or other type of pointing device, and is used in combination with the keyboard 310 to input data into the computer 300. The graphics adapter 312 displays images and other information on the display device 318. The network adapter 316 couples the computer 300 to a network. Some embodiments of the computer 300 have different and/or other components than those shown in FIG. 3. The types of computer 300 can vary depending upon the embodiment and the desired processing power. Other computing devices may alternatively be used as the user device 210, such as a tablet, a smart phone, an Internet television, or a gaming console.

Notes Editing Platform

As a user reads and interacts with the multilayered document, the eReader application 170 enables the user to create personal notes associated with the document. In one embodiment, each user account and layered content document is associated with an HTML5 notepad for creating and organizing user-generated notes. The notepad, comprising a data object including a plurality of note regions for storing user-generated notes, may be stored and distributed by the publishing platform 200. The user may create, view, and organize notes within the notepad by interacting with a notepad application 405 executing on the user's device 210.

Figure 4:
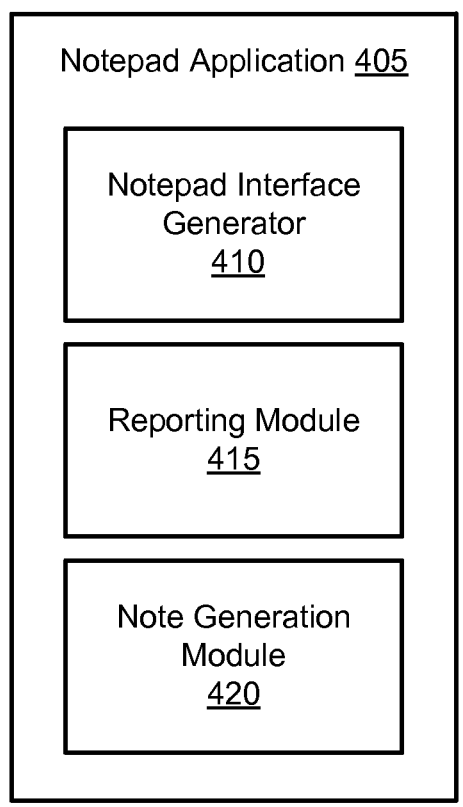
FIG. 4 is a block diagram illustrating modules within a notepad application, according to one embodiment.

FIG. 4 illustrates the notepad application 405 including a notepad interface generator 410, a reporting module 415, and a note generation module 420. Other embodiments of the notepad application 405 include fewer or more modules. In one embodiment, the notepad application 405 enables a user to read and annotate a document distributed by the publishing platform 200. The notepad application 405 may be configured as a plug-in compatible with the web browser 215, or it may be integrated with the eReader application 170 in a single application.

In another embodiment, an eReading browser application gateway can be used to abstract client-side application components and provide a mechanism for these components to communicate with each other and with their environment without breaking the abstraction principle. The abstraction layer is defined as a sandbox environment, where each of the application components is isolated into individual wrappers. As such, the abstraction layer becomes the only way for components to gain access to the application itself or to other components that are accessible through the abstraction layer. The application gateway is particularly useful when considering the extensibility of the eReading Applications. Specifically, by publishing wrappers API through the application gateway, developers design and add components that seamlessly integrate with eReading browser applications. This assists in developing an environment that facilitates having client web applications that provide the same level of service that a stand-along desktop application provides.

For example, the notepad application 405 can be framed as a secondary application within the eReading browser application 170. As such, the addition and integration of notes into the eReading browser applications 170 are architected around application components specific to notes and their associated wrappers which are registered to the eReading application internal and external gateways. This implementation is particularly useful when considering the maintenance and upgradability of deployed eReading browser applications as each component can be updated separately, and disabled if necessary, while still being able to communicate within a controlled environment. This same capability can be used to activate or deactivate an application's features and reorganize them into different feature sets, which allows, for instance, for the notepad application 405 to be defined as a stand-alone HTML5 editing platform.

The notepad application 405 is fundamentally linked to the particular layered content document that is being accessed by a user at the time of launch. For instance, all the user's notes to be created following the launch of a notepad user interface are referenced from within the structure of the opened layered content document, including specific information about the table of contents from that document. By referencing the table of contents of the open document, the notes can be mapped to page locations within the original document and thus become supplemental material to the existing publication.

Figure 5A:
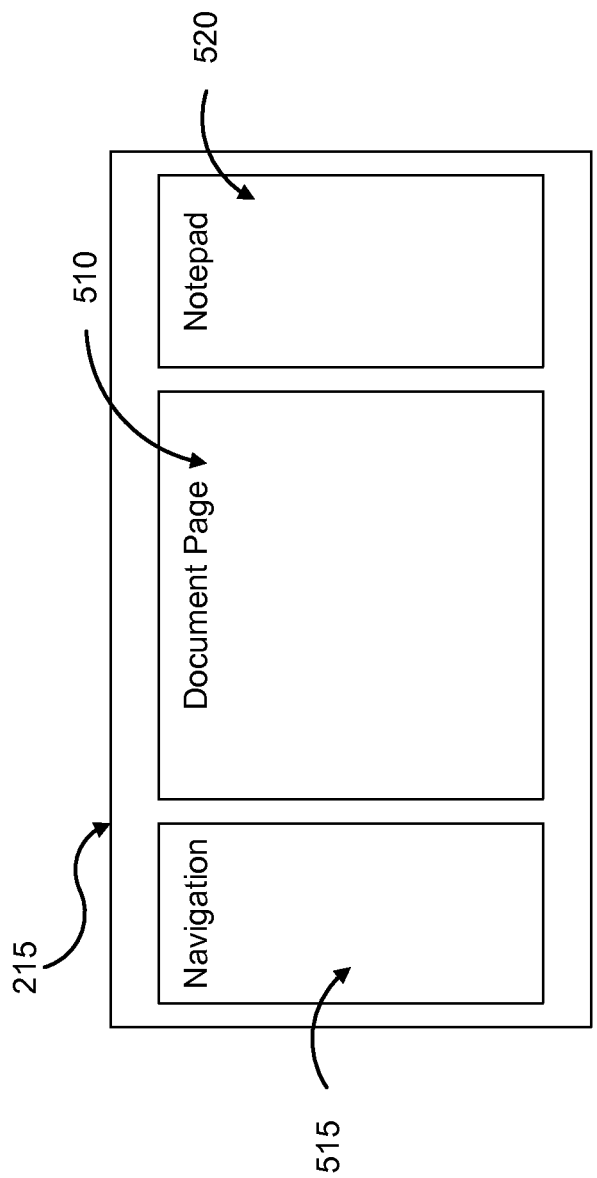
FIG. 5A illustrates an example user interface for reading and annotating a document, according to one embodiment.

An example user interface generated by the eReader application 170 and displayed by the browser 215 is illustrated in FIG. 5A. As a user reads the document, each page is fetched by the eReader application 170, rendered by the browser 215, and displayed within the document page window 510. The navigation pane 515 lists the table of contents of the document or a high-level summary of the table of contents, enabling a user to view an outline of the document structure. In one embodiment, a user may navigate through the document by clicking on links within the navigation pane 515. For example, when the user clicks on a link titled "Chapter 3," the eReader application 170 will fetch the page having the start of chapter 3 from the publishing platform 200. Alternatively, one or more pages may be cached by the device 210, in which case the eReader application 170 may retrieve a page from the device's cache rather than directly fetching it from the platform 200. Browser 215 may then display the fetched (or retrieved) page within the document page window 510.

Notepad panel 520 is a user interface generated by the notepad interface generator 410 within the browser 215 for enabling a user to create and view notes. The notepad panel 520 may be created by the interface generator 410 during an eReading session by, for example, a user selecting a notepad icon displayed in the browser 215. The selection of the icon launches the notepad application 405, which opens the notepad panel 520 in the same HTML5 browser tab as the already-opened eReading browser application 170. In one embodiment, the notepad panel 520 is rendered alongside the document page 510 in the same browser tab, as illustrated in FIG. 5A. However, displaying both the document page 510 and the notepad panel 520 may limit the amount of display space available for the notepad panel 520. This may result, in part, from a requirement that the HTML5 document page be rendered with page fidelity to the original ingested content page of the document. Thus, to compensate for the differences in visual presentation between these forms of content, the notepad application 405 may have a wide screen mode that gives notepad content access to the entire screen available within a browser tab. That is, the notepad panel 520 may be configured to occupy the navigation pane 515 and page window 510 illustrated in FIG. 5A when, for example, a user clicks an "expand window" button or drags the notepad panel 520 to the left. In another embodiment, a user may effectively separate the notepad panel 520 from the document page window 510 by opening the notepad on a different paired device and closing the notepad panel 520 on the first device.

Figure 5B:
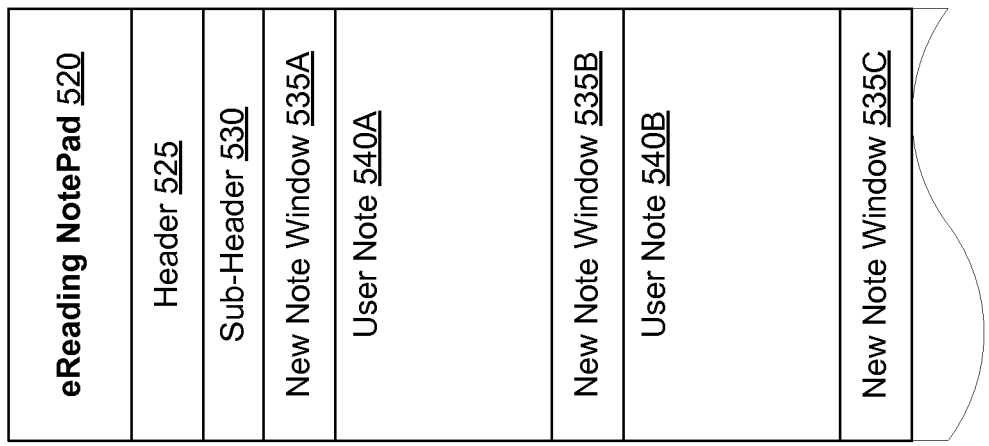
FIG. 5B illustrates an example notepad user interface, according to one embodiment.

One embodiment of the notepad panel 520 is illustrated in more detail in FIG. 5B. The header 525 lists the title of the opened layered content document to which all user notes for that particular document will refer. The header information is extracted from the eReading browser application 170 that is processing the table of contents of the layered document.

For example, user "Joe" accessing the "Biology101" document from the eReading browser application 170 generates, upon launching of the notepad application 405, a notepad document with the header "Biology101+Joe" that is stored by the publishing platform 200.

The sub-header 530 lists the generic location within the document that is open while a user creates or edits a note. The generic location used by the sub-header 530 is defined by table of contents level information as extracted from the document, such as chapter or subchapter. For example, user "Joe" adding the first note in "Chapter 1" of "Biology101" within the eReading application 170 will create a new sub-heading "Biology101+Chapter1" on the notepad panel 520. As an another example, user "Joe" adding a second note to "Chapter1" of "Biology101" from the eReading browser application will append the second note under the existing sub-heading "Biology101+Chapter1" of the notepad document "Biology101+Joe."

The notepad panel 520 may include one or more note windows, such as new note windows 535 and user notes 540. The user notes 540 are notes already existing in the notepad beneath the sub-header 530. The new note windows 535 are empty boxes in which a user may create new notes. When selected, the note window is switched from passive (display) to active (editing) mode, which enables the creation or importation of content into it.

Each user's notepad includes at least one note region corresponding to a note window displayed in the notepad panel 520. A note window is defined as a dynamically resizable box within the HTML5 notepad panel 520, displayed within the user interface for either the editing or rendering of content as selected by the user. A note window is either in a passive (display) or active (editing) mode. Each note region associated with each note window is identified by a descriptor and set of metadata that are unique to the particular user's activities that led to the creation of that note and as managed by the notepad application 405 overall. For instance, a note region's metadata typically includes information such as the type and nature of its embedded content, source and origin of its embedded content, the imported location designation within the original document, the location referential within the notepad panel 520, the time of creation, and a log to keep track of various edits over time. The metadata may also include information about the user who created the note, providing the user with explicit rights to ownership of the note. During the course of note taking activities, notes are progressively added to the user's notepad document in an expanding list of regions stacked on top of each other within the section of the document to which these notes belong. The aggregation, organization, and management of these regions by the notepad application 405 translates into an HTML5 notes document that is unique to a particular user and layered content document.

The notes generation module 420 receives user inputs to generate notes. The user input indicates a location in the document, and the notes generation module 420 associates the note generated as a result of the user input with the indicated location. The user input may be received at the note window displayed in the notepad object 520. For example, the user may click on the note window, such as note window 535A, or hover a cursor over the note window. The user may then input content into the note by typing within the note window.

Alternatively, the note generation module 420 may receive a user input at another location but associated with a particular note window. For example, the user may select content of the document to import into a note without specifying a note window in which to copy the text. The selected content may be extracted from the rendered HTML5 page and imported as text-only in the targeted note region. The selected content may alternatively be imported as a graphic object, such as a bitmap, which keeps the original content's formatting including fonts and other layout information. The note generation module 420 may automatically add the selected content to the next available note window beneath the sub-header indicating the location from which the content was imported. When content of the multilayered document is selected and added to the note, it provides a link between the note and the section of the document in which the content is located.

In one embodiment, regardless of whether the content is imported in an HTML5 or bitmap format, the newly added note keeps specific mention of the original licensing rights of the layered content document. For example, content copyright information as defined by the platform service provider and/or owner of the layered content document can be associated with the note, either by explicitly displaying the information within in the note or attaching the information to the note region as metadata. Furthermore, the licensing policies of the original document can be associated with each note. That is, if the multilayered document has a licensing policy restricting, for example, the amount of the document that can be copied and pasted at another location, the same policy is applied to the notes. As a result, the quantity of content that can be copied into a note, or the content that can be copied from the note and pasted at another location, may be limited based on the policy. Similarly, if the multilayered document has a licensing policy restricting the amount of the document that can be printed, the amount of notepad content (that was copied from the document) that can be printed may be similarly restricted.

Another example of a user input to generate a note may be looking up information in an external knowledge database such as an online dictionary or an encyclopedia. The note generation module 420 may the import the resulting lookup definition into an empty note window, such as new note window 535A, as a bitmap that maintains the integrity of the original content and includes the original copyright information of the external database.

The user may also add into a note region a selectable link to a destination web page. The note generation module 420 may then access the destination page to analyze its properties and capture the title, summary, and, optionally, graphical information. The note generation module 420 aggregates this information, formats it into a custom bitmap that fits the dimensions of a note window, attaches the original link to the bitmap, and inserts the combined bitmap and link into the note window.

As another example of importing content into a note, a user may add multimedia content, such as an image or a video or audio file, into a note region. The note generation module 420 analyzes the file to determine its properties, such as file format, extension, length, and copyright information, and, if applicable, captures a thumbnail of an image associated with the file. The resulting information is aggregated into a custom bitmap that fits the dimensions of the note window and includes an audio or video embedded player and its navigation commands such as play, pause, skip forward, and skip backward, for example. This approach allows the multimedia content to be launched from within the note window.

Yet another example of a user input to generate a note may be an email sent to an email account registered to the user. The email account, operated by the publishing platform 200, enables a user to automatically import content directly into his notepad. The publishing platform 200 receives emails sent to this account, including content embedded in the email such as text, images, multimedia files, and links. The platform 200 extracts a note header and/or indexing keywords to match the email to one or more documents the user is authorized to access. The email is then processed by extracting the embedded content, analyzing the content to determine its properties, and formatting it into one or more independent unmapped notes windows, such as new note window 535A. The email may indicate a location within the document with which to associate the emailed note (e.g., Chapter 1, Part 1). If no location is specified, the note may be automatically added to a new note window following the last note in the user's notepad associated with the document specified by the emailed note.

If the user is reading a document while creating notes through email, the distribution system 140 may automatically synchronize the emailed notes with any existing notes in the user's notepad document and map the emailed notes to locations within the open layered content document. Alternatively, if the user creates notes via email while not reading the layered content document, the notes added by email may be synchronized with existing notes and mapped to locations in the associated document at the start of the user's next eReading session.

When the user has completed the note, the user clicks on the close box or outside of the note window, enabling the particular note to be indexed, synchronized, and referenced by the notepad application 405 with the specific page of the layered content document from which the note originated. The note is then added to a note region within the notepad associated with the user and layered content document, with the note regions structured according to the table of contents of the document. The note regions may contain metadata describing the attributes of the note, such as a reference to the applicable header and sub-header information, the time the note was created, type of content of the note, or keywords of the content. If applicable, the note region may also inherit metadata describing digital rights management information of the source content. In one embodiment, a user completing a note causes the notepad interface generator 410 to automatically open a new and empty note window in passive mode just before and after the completed note, such as new windows 535B and 535C displayed before and after user note 540B.

The user's notes created by accessing a particular chapter of a layered content document are grouped into the same chapter section within the notepad panel 520. As the listing of these individual notes gets longer than the actual length of the opened browser tab which hosts the rendered HTML5 document page and the notepad panel 520, a scroll bar may be added to the notepad panel 520 to be able to list all the available notes within a document or document section, without changing the rendered HTML5 page of the document being accessed. Using the scroll bar, the note editing platform quickly recovers, synchronizes, and lists all available notes within the opened document. As a result, the user can quickly access his notes across the entire layered content document, even though only a limited portion of the document is stored on the user's device 210 at any given time.

Each note window, as displayed in the notepad panel 520, is fundamentally tied to a note region in the user's notepad. Because the note regions inherit the structure of the associated document, each region is associated with a particular location in the document. As a result, a user may rearrange the order of the note windows in the notepad panel 520 without losing the coupling between each note and its associated location in the document.

In one embodiment, the partial decoupling between notes and document pages synchronization provides the user with a mechanism to consult existing notes within the entire layered document without necessarily downloading the specific document pages that are referenced by these individual notes. This is particularly important when layered content documents are only partially cached into the local browser environment, which may result in possible latency between the requested page content and the actual rendered page content.

The decoupling between reviewing notes and rendering pages of HTML5 documents may stay in effect until the user selects from within a note an embedded page referenced location within the document. This in turn forces the eReading browser application 170 to synchronize to that particular page by either rendering it directly, if that page is already in the cache, or otherwise fetching the page from the platform content distribution system 140. Similarly, accessing from the eReading browser application 170 a different page than is currently rendered also results in synchronizing the notepad panel 520 with the notes available, if any, for that new page within the layered content document.

In one embodiment, a user may access the notepad application 405 from multiple connected devices. The reporting module 415 manages the redistribution of notepad content to all user devices displaying the notepad panel 520. For example, reporting module 415 uploads and reports user-generated notes from the user's connected devices to the distributions system 140 of the publishing platform 200. The notes are uploaded to the distribution system 140 for saving and distribution of the notes. As a result, a user's notepad may be effectively synchronized across all connected devices.

Creating Notes within an HTML5 Document

Figure 6:
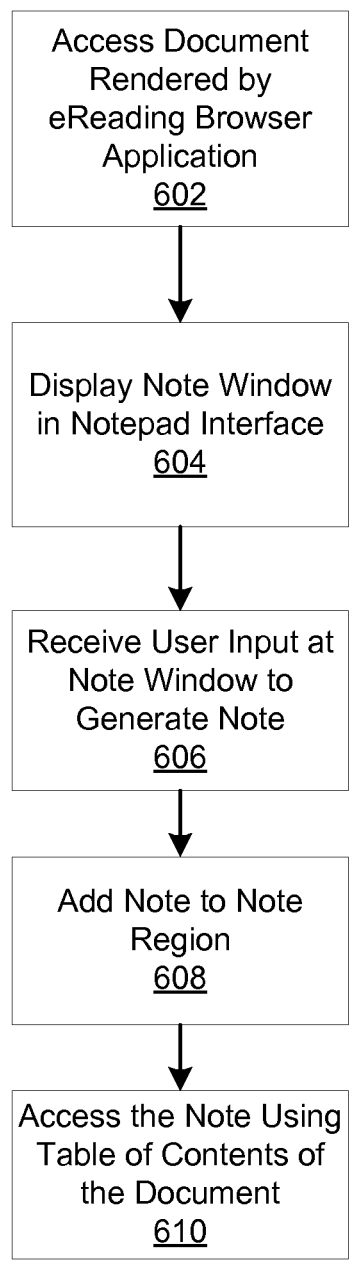
FIG. 6 is a flowchart illustrating a method for creating notes associated with a document, according to one embodiment.

A process for creating notes is summarized in the flowchart of FIG. 6. The notepad application 405 accesses 602 a document distributed by the publishing platform 200 that is being rendered by an eReading browser application executing on a user device. The document has a table of contents defining the structure of the document, including a plurality of sections within the document. A notepad stored on the publishing platform 200 may be associated with the layered content document and the user viewing and interacting with the document.

The notepad application 405 then opens a notepad panel 520 in the eReader browser application 170 and displays 604 a note window in the notepad panel 520. The note window may be color coded or may contain a label such as "Click here to add content" so as to be easily identifiable by the user. The note window supports free text entry which is associated to the adjacent layered content document page opened by the eReading browser application 170.

A user input to generate a note is then received 606 by the notepad application 405. The user input may be, for example, typing of a note, importing text from the layered content document, looking up information in an external knowledge database, referencing a link, or sending an email to a dedicated notepad email account. The note may be displayed within a note window while the user is generating the note and after the note is generated. The appearance of the note in the note window depends on the source of the note's content. For example, the note may comprise one or more of unformatted HTML text, a bitmap, a summary of a linked page, a thumbnail of a multimedia application, and an embedded multimedia player.

When the note is completed, the notepad application 405 adds 608 the note to a note region within the notepad document. When a user creates and adds notes in a notepad document associated with a layered content document, the application 405 indexes the notes into the overall notepad document, which is unique to a particular user. As a result of this indexing process, which may be undertaking constantly or periodically, the user can reorganize the listing of the existing notes by changing their respective locations within the notepad panel 520. That is, any existing notes may be reorganized in any order within the notepad panel 520, while maintaining the association with the document structure of the layered content document.

Because each note inherits metadata describing a location in the document with which the note is associated, the note may then be accessed 610 using the table of contents of the document. As a user reads and navigates through the document, the notepad application 405 accesses notes associated with the section of the document currently rendered by the eReader application 170 and displays them to the user.

Aggregating Notes Across Multiple Documents

In one embodiment, notes associated with multiple documents can be aggregated into a single set of notes to enable users to more easily review these notes. Similarly, multiple notes sets associated with the same document but created by different users can be aggregated into a single set. A notes aggregation system 705 analyzes the note region metadata of each note set to be aggregated and creates combined metadata for each note. Based on the combined metadata, the notes are merged into a single aggregated set of notes.

Figure 7:
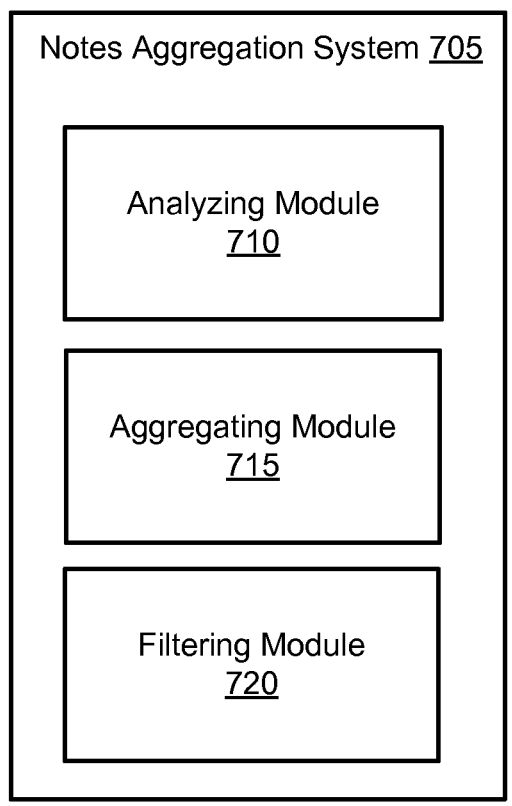
FIG. 7 is a block diagram illustrating modules within a notes aggregation system, according to one embodiment.

FIG. 7 illustrates the notes aggregation system 705 including an analyzing module 710, an aggregating module 715, and a filtering module 720. Other embodiments of the notes aggregation system 705 include fewer or more modules. In one embodiment, the notes aggregation system 705 is configured as a subsystem of the publishing platform 200. In other embodiments, the notes aggregation system 705 may be configured to communicate with the publishing platform 200 through a network, such as the network 205. For example, the notes aggregation system 705 may execute on the user device 210.

User notes generated by the notepad application 405 executing on a user device 210 are uploaded to the publishing platform 200. The analyzing module 710 of the notes aggregation system 705 analyzes the structure and properties of notes and creates combined metadata that enables the aggregation of the notes. For each set of notes to be aggregated, the analyzing module 710 extracts header information and aggregates the individual headers into a combined header describing the sets. For example, a user "Joe" who is authorized to access the documents "Biology 101" and "Biology 102" takes notes associated with both documents. If Joe requests to merge his "Biology 101+Joe" notepad with his "Biology 102+Joe" notepad, the analyzing module 710 creates a combined header "Biology 101+Biology 102+Joe." As a second example, if Joe is authorized to access notes created by a user "Anna" associated with the "Biology 101" document and requests to merge Anna's notes with his own, the analyzing module 710 creates the combined header "Biology 101+Joe+Anna."

In one embodiment, the analyzing module 710 also extracts sub-header information from each set of notes to be aggregated. If the sets have similar sub-headers, the analyzing module 710 aggregates the similar sub-headers into combined sub-headers. The similarity of sub-headers may be determined based on chapter or section references, such as numbers or titles. For example, if Joe is merging his "Biology 101+Joe" and "Biology 102+Joe" notepads into a single document, and both notepads have notes under a sub-header "Chapter 1," the analyzing module 710 creates a combined sub-header "Biology 101+Biology102+Chapter 1+Joe."

The analyzing module 710 restructures the header and sub-header data fields of each note to be imported to include the relevant combined metadata. For example, if a note under the sub-header "Biology 101+Chapter 1+Joe" is to be imported into the aggregated notepad "Biology 101+Biology 102+Joe," the header metadata of the note is revised to specify the combined header "Biology 101+Biology 102+Joe" and the sub-header metadata is revised to specify the combined sub-header "Biology 101+Biology 102+Chapter 1+Joe."

The aggregating module 715 creates an aggregated notepad associated with the user requesting to aggregate notes. In one embodiment, the aggregating module 715 imports notes into the aggregated notepad based on the attributes of the notes as defined by the combined metadata. In one embodiment, the aggregating module 715 structures the aggregated notepad according to the combined headers and sub-headers, creating a table of contents for the notepad that mirrors the table of contents of the associated documents.

In one embodiment, after aggregating the notes of each section based on the header and sub-header information, the aggregating module 715 organizes the notes based on other attributes of the notes. For example, the aggregating module 715 may determine an order of the notes in the aggregated notepad based on the page location with which each note is associated. By organizing the notes according to their original page location, the aggregated notes would be configured in a logical order for a user who is reading one of the associated documents from start to finish. Alternatively, the aggregating module 715 may determine the order of the notes based on a number of other attributes, such as the time each note was created, keywords describing the contents of each note, licensing rights associated with each note, or the user who created the note. Users may specify an organizational scheme when requesting to generate the aggregated notepad, or may reorganize the notes after aggregation.

The filtering module 720 filters the aggregated notes based on attributes of the notes. Any attribute of the note can be used as a filter, including time of creation, keywords, type of content, licensing rights, or social attributes. For example, the user Joe may request to aggregate his notes associated with "Biology 101" and "Biology 102" that he took over a given time interval, such as January through May of 2012. The time interval may correlate to the length of a course, the length of a section of a course, a single day, or any other period of time over which a user wishes to aggregate notes. In response, the filtering module 720 extracts the time metadata of the notes of the "Biology 101+Joe" and "Biology 102+Joe" documents and sends the notes having a creation time within the specified range to the aggregating module 715. The aggregating module 715 generates an aggregated notepad "Biology 101+Biology 102+01/12-05/12+Joe" to store the notes of the filtered set.

As a second example of filtering, the user Joe may request to aggregate his notes associated with "Biology 101" and "Biology 102" that include content relating to a particular topic, such as cells. The filtering module 720 extracts keywords from the notes of the two notes documents, determines which notes have the keyword "cell," and sends the notes having the keyword for inclusion in the aggregated notepad "Biology 101+Biology 102+'cell'+Joe."

Yet another example is filtering aggregated notes based on type of content in the notes, such as multimedia content, images, or text-only content. If, for example, the user Joe requests to aggregate his "Biology 101" notes that have an embedded video with the embedded video "Biology 101" notes of user Anna, the filtering module 720 extracts content metadata from the notes of the two sets and selects the notes having embedded videos for inclusion in a "Biology 101+videos+Joe+Anna" notepad.

The aggregated notepad document created by the aggregating module 715 retains the properties described herein of a notepad associated with a single multilayered document. If an aggregated notepad is associated with one multilayered document, such as the case of the aggregated "Biology 101+Joe+Anna" notepad, the aggregated notes may be displayed in the notepad panel 520 adjacent to the associated multilayered document. Alternatively, the aggregated notepad may be viewed as a stand-alone document. The notes in the aggregated notepad, whether viewed in the notepad panel 520 or as a stand-alone document, retain their association to a particular page location and have a link to that location. For example, the eReading browser application 170 may fetch the page having the location with which a note is associated when a user clicks on the note in the aggregated notepad, if the user is authorized to access the associated page.

Figure 8:
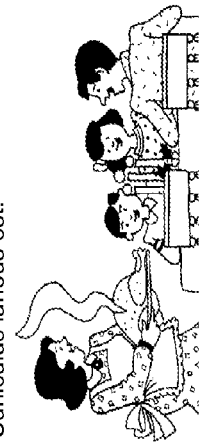
FIG. 8 illustrates an example aggregated notepad adjacent to a document page, according to one embodiment.

An example of an aggregated notepad is illustrated in FIG. 8. The document page 800 illustrated in FIG. 8 is page 4 in chapter 1 of a textbook entitled "Biology 101." In one embodiment, the notepad panel 805 can be displayed adjacent to the document page 800 in a user's browser. The panel 805 lists header and sub-header information for the notepad document open in the panel. For example, FIG. 8 illustrates an aggregated notepad "Biology 101+Biology 102+Anna," as indicated by the header 810 "Anna's Biology 101+Biology 102 Notes," open in the panel 805. Notes associated with "Chapter 1" of both of the "Biology 101" and "Biology 102" textbooks have been merged under a combined sub-header, as indicated by the sub-header 815 "Chapter 1." The illustrated aggregated notepad includes notes associated with both textbooks that are interleaved according to the order of the pages referenced by each note, but a user may specify a different organizational scheme for the aggregated notes.

The notes that have been aggregated maintain an association to an original page location. For example, the note 820 is text copied from the text 830 of the document page 800. The page reference 825 "pg. 4, 'Biology 101'" is hypertext linking to the associated location. If, for example, the user is viewing page 8 of the "Biology 102" textbook, and if the user clicks on the page reference 825, the eReader browser application fetches page 4 of "Biology 101" and renders it adjacent to the notepad panel 805. The page reference 825 may not be explicitly displayed with content of a note. For example, the note region displaying the note 820 may be displayed as a button or hypertext linking to the text 830.

The aggregated notes may alternatively be displayed as a standalone document 900, as illustrated in FIG. 9. In one embodiment, a user can click on hypertext within a note region (e.g., hypertext 905) to access the page of the document with which the note is associated. The associated page may be opened on the same device as the standalone notepad document 900, or on a different device. For example, clicking on hypertext may open a document page adjacent to the notepad document in the user's browser, as illustrated in FIG. 8. As another example, a user may use a tablet to access the standalone notepad document 900 and a laptop to access the "Biology 102" textbook. When the user clicks on the hypertext 905, the notepad application 405 reports the click event to the publishing platform 200, which in response pushes page 7 of "Biology 102" to the eReading browser application executing on the user's laptop.

FIG. 9 further illustrates an example of filtered notes. The header 910 "Anna's Biology 101+Biology 102 Notes: Jan. 1-May 8, 2012" indicates that the notes of the standalone document 900 are an aggregation of Anna's notes taken between Jan. 1, 2012 and May 8, 2012. Each note includes time metadata indicating the time that the note was created, which may be used to generate a time stamp such as the time stamp 915 "01/01/12 8:45 pm." When "Anna" requested to generate the filtered, aggregated note set illustrated in FIG. 9, the filtering module 720 extracted the time metadata from each note and selected the notes created in the specified time interval for aggregation. The aggregation module 715 organized the notes of the standalone document 900 by the time that each note was generated, although other organizational schemes are possible.

Figure 10:
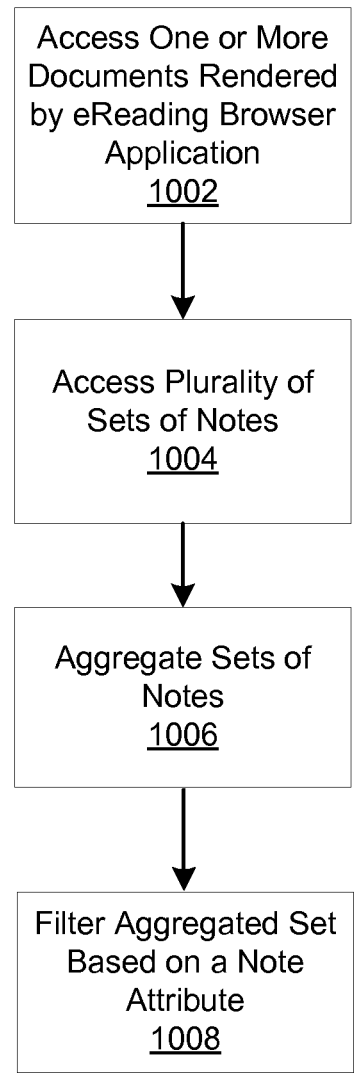
FIG. 10 is a flowchart illustrating a method for aggregating a plurality of sets of notes, according to one embodiment.

FIG. 10 is a flowchart illustrating a method for aggregating notes associated with a plurality of documents. In one embodiment, the steps of the method are performed by the notes aggregation system 705. In other embodiments, the steps may be performed by other entities, or may include different and/or additional steps.

The notes aggregation system 705 accesses 1002 one or more documents that are configured for rendering by eReading browser applications executing on user devices. The one or more documents may be multiple unique documents that a single user is registered to access, or may be the same document accessed by a plurality of users. Each document is associated with a table of contents that defines sections of the document, such as chapters and page locations of the document's content.

The notes aggregation system 705 accesses 1004 a plurality of sets of notes, each having one or more notes. Each set of notes is associated with one of the documents accessed by the platform, and each note within each set is associated with a location in the corresponding document.

The sets of notes are aggregated 1006 into an aggregated set that includes the notes of the plurality of sets of notes. Each note in the aggregated set maintains its association with a location in a document that was defined when the note was created.

In one embodiment, the notes are filtered 1008 based on attributes of the notes, such as time of creation, keywords, licensing rights, and social sharing attributes. The filtered notes are aggregated into an aggregated notes document that may be viewed in a browser tab adjacent to one of the associated documents, or as a standalone document.

Additional Configuration Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for aggregating notes associated with a plurality of documents, the method comprising:
accessing the plurality of documents, each document associated with a table of contents listing a plurality of sub-headers extracted from the document and defining a plurality of sections of the document, each sub-header corresponding to a section of the document defined by the table of contents, wherein the documents are configured to be rendered by an eReader browser application;
accessing a plurality of sets of notes, each set of notes associated with one of the documents and comprising one or more notes, wherein each note of a set of notes is linked to a location in the document associated with the set of notes;
identifying a section of a first document and a section of a second document having similar sub-headers; and for the identified sections, aggregating notes linked to locations in the identified section of the first document with notes linked to the locations in the identified section of the second document to generate an aggregated set of notes, each note in the aggregated set of notes including a link to the location in the corresponding document with which the note is associated, wherein the aggregated set of notes includes a combined header that specifies the headers of the first and second documents and users who created each set of notes.

2. The method of claim 1, further comprising:
filtering the aggregated set of notes based on an attribute of the notes in the aggregated set of notes; and
generating a filtered set of notes, the filtered set comprising the filtered notes.

3. The method of claim 2, wherein the attribute of each note specifies a time that the note was created.

4. The method of claim 2, wherein the attribute of each note specifies the location in the document with which the note is associated.

5. The method of claim 4, further comprising:
determining a page order of the locations in the documents associated with the notes in the aggregated set;
determining an order of the notes in the aggregated set based on the locations in the documents with which the notes are associated and the determined page order of the locations within the documents; and
displaying the notes in the aggregated set in the determined order.

6. The method of claim 2, wherein the attribute of each note specifies a keyword describing content of the note.

7. The method of claim 2, wherein the attribute of each note specifies licensing rights of content of the note.

8. The method of claim 2, wherein the attribute of each note specifies a user who created the note.

9. The method of claim 2,
wherein the plurality of documents are associated with one or more educational courses; and
wherein the attribute of each note specifies an educational course from the one or more educational courses associated with the plurality of documents.

10. A method for aggregating notes created by a plurality of users, the method comprising:
accessing a document, the document associated with a table of contents listing a plurality of sub-headers extracted from the document and defining a plurality of sections of the document, the document configured to be rendered by an eReading browser application;
accessing a plurality of sets of notes, each set of notes associated with one of the users in the plurality of users and comprising one or more notes, wherein each note of a set of notes is linked to a location in the document; and
for a target section of the document:
identifying a plurality of notes from two or more of the sets of notes linked to a location in the target section; and
aggregating the identified notes into an aggregated set of notes, wherein the aggregated set of notes comprises the notes of the plurality of sets of notes, each note in the aggregated set of notes including a link to the location in the document with which the note is associated, wherein the aggregated set of notes include a combined header that specifies a header of the document and users who associated with each set of notes.

11. The method of claim 10, further comprising:
filtering the aggregated set of notes based on an attribute of the notes in the aggregated set of notes; and
generating a filtered set of notes, the filtered set comprising the filtered notes.

12. The method of claim 11, wherein the attribute of each note specifies a time that the note was created.

13. The method of claim 11, wherein the attribute of each note specifies the location in the document with which the note is associated.

14. The method of claim 13, further comprising:
determining a page order of the locations in the document associated with the notes in the aggregated set;
determining an order of the notes in the aggregated set based on the locations in the document with which the notes are associated and the determined page order of the locations within the document; and
displaying the notes in the aggregated set in the determined order.

15. The method of claim 11, wherein the attribute of each note specifies a keyword describing content of the note.

16. The method of claim 11, wherein the attribute of each note specifies licensing rights of content of the note.

17. The method of claim 11, wherein the attribute of each note specifies a user who created the note.

18. A non-transitory computer-readable storage medium storing executable computer program instructions, the computer program instructions comprising instructions for:
accessing a document, the document associated with a table of contents listing a plurality of sub-headers extracted from the document and defining a plurality of sections of the document, the document configured to be rendered by an eReading browser application;
accessing a plurality of sets of notes, each set of notes associated with one of the users in the plurality of users and comprising one or more notes, wherein each note of a set of notes is linked to a location in of the document;
for a target section of the document, identifying a plurality of notes from two or more of the sets of notes linked to a location in the target section; and
aggregating the identified notes into an aggregated set of notes, wherein the aggregated set of notes comprises the notes of the plurality of sets of notes, each note in the aggregated set of notes including a link to the location in the document with which the note is associated, wherein the aggregated set of notes include a combined header that specifies a header of the document and users who associated with each set of notes.

19. The non-transitory computer-readable storage medium of claim 18, the instructions further comprising instructions for:
filtering the aggregated set of notes based on an attribute of the notes in the aggregated set of notes; and
generating a filtered set of notes, the filtered set comprising the filtered notes.

20. The non-transitory computer-readable storage medium of claim 19, wherein the attribute of each note specifies a time that the note was created.

21. The non-transitory computer-readable storage medium of claim 19, wherein the attribute of each note specifies the location in the document with which the note is associated.

22. The non-transitory computer-readable storage medium of claim 21, further comprising instructions for:
determining a page order of the locations in the document associated with the notes in the aggregated set;
determining an order of the notes in the aggregated set based on the locations in the document with which the notes are associated and the determined page order of the locations within the document; and
displaying the notes in the aggregated set in the determined order.

23. The non-transitory computer-readable storage medium of claim 19, wherein the attribute of each note specifies a keyword describing content of the note.

24. The non-transitory computer-readable storage medium of claim 19, wherein the attribute of each note specifies licensing rights of content of the note.

25. The non-transitory computer-readable storage medium of claim 19, wherein the attribute of each note specifies a user who created the note.

* * * * *

UNITED STATES PATENT AND TRADEMARK OFFICE
CERTIFICATE OF CORRECTION

PATENT NO. : 9,600,460 B2
APPLICATION NO. : 13/693036
DATED : March 21, 2017
INVENTOR(S) : Yehuda Gilead et al.

Page 1 of 1

It is certified that error appears in the above-identified patent and that said Letters Patent is hereby corrected as shown below:

In the Claims

Column no: 17, Line(s): 45, Claim 10, change "who associated" to read as –who are associated–

Column no: 18, Line(s): 18, Claim 18, change "location in of the" to read as –location in the–

Column no: 18, Line(s): 30, Claim 18, change "who associated " to read as –who are associated–

Signed and Sealed this
Twenty-fourth Day of October, 2017

Joseph Matal
*Performing the Functions and Duties of the
Under Secretary of Commerce for Intellectual Property and
Director of the United States Patent and Trademark Office*